(No Model.)
H. R. POMEROY.
HYDROGEN GAS MACHINE.
No. 517,062. Patented Mar. 27, 1894.
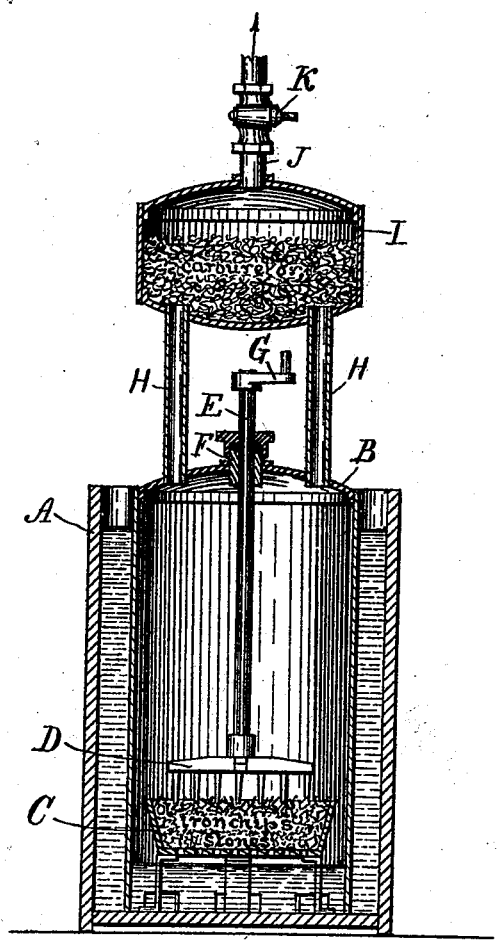
Witnesses
H. P. Hood,
V. M. Hood.
Inventor
Henry R Pomeroy

UNITED STATES PATENT OFFICE.

HENRY R. POMEROY, OF INDIANAPOLIS, INDIANA, ASSIGNOR OF ONE-HALF TO ALBERT F. KOPP, OF SAME PLACE.

HYDROGEN-GAS MACHINE.

SPECIFICATION forming part of Letters Patent No. 517,062, dated March 27, 1894.

Application filed February 12, 1894. Serial No. 499,859. (No model.)

*To all whom it may concern:*

Be it known that I, HENRY R. POMEROY, a citizen of the United States, residing at Indianapolis, in the county of Marion and State of Indiana, have invented a new and useful Improvement in Hydrogen-Gas Machines, of which the following is a specification.

My invention relates to that class of gas machines in which hydrogen gas is produced by the action of dilute acid upon iron chips; said hydrogen gas being afterward enriched by passing through a chamber containing a hydro-carbon, as kerosene or gasoline. In this class of machines, as heretofore constructed, the production of hydrogen is very much retarded, or is stopped altogether, by the coating of the iron particles with sulphate of iron and other products resulting from the decomposition of the material used, the iron being thus protected from the action of the acid.

The object of my improvement is to provide means whereby the coating of inert matter may be removed from the iron particles while in position in the machine.

The accompanying drawing illustrates my invention.

The figure represents a central vertical section of the apparatus.

In the drawing, A, indicates an open tank, in which is arranged a metallic cylinder, B, closed at the top and open at the bottom, and constituting a reservoir for hydrogen gas.

Arranged within reservoir B, and raised above the bottom of the tank A, is a generating tray, C, having a perforated bottom.

Arranged above tray C, is a rake, or stirrer, D, mounted upon the lower end of a shaft, E, which is suspended in a bearing, F, so as to revolve and slide longitudinally therein. The upper end of shaft E, is provided with a crank, G, so that the shaft may be moved longitudinally, or revolved in its bearing.

Arranged above reservoir B and connected therewith by pipes, H, H, is the carbureting chamber, I, which is provided with a discharge pipe, J, having a stop valve K.

The operation of my device is as follows:—

The tray C, is first filled with a mixture of iron chips and small pieces of silicious stone or other gritty matter which will resist the action of acids. Reservoir B being in position over the tray, tank A is partly filled with dilute sulphuric acid, which, passing beneath the lower edge of the reservoir, rises through and above the tray and attacks the iron chips therein, thereby producing hydrogen gas, which passes by the pipes H to the carburetor I from whence it is discharged through the pipe J. Valve K being closed the accumulation of gas in the reservoir presses the acid out of the reservoir till its surface is below the tray, thus stopping the production of gas. During the action of the acid upon the iron chips they have become coated with the products of decomposition. For the purpose of removing this deposit while the pressure of gas is still maintained, the stirrer D is rotated and pushed downward into the mass of material in the tray, which, being violently agitated, the grit or stone contained therein operates to scour the deposit from the particles of iron; which deposit is afterward washed out of the tray by the ebb and flow of the acid through the perforations in the bottom of the tray.

I claim as my invention—

1. In a gas machine of the class described, the combination with the reservoir, the generating tray arranged therein, and the gas-producing material contained in said tray, of the gritty material, as broken stone, intimately mixed with said gas-producing material, the stirrer arranged to engage said mixture, and means for operating said stirrer from the exterior of the reservoir, whereby the gas-producing material may be scoured, substantially as and for the purpose set forth.

2. In a gas machine, the tank, the tray arranged therein, the reservoir inclosing the tray, the mixture of gas-producing material and broken stone contained in said tray, the revoluble shaft mounted in the reservoir and projecting therefrom, and the stirrer secured to said shaft and arranged to engage the material in the tray, all combined and arranged to co-operate substantially as set forth.

HENRY R. POMEROY.

Witnesses:
H. P. HOOD,
V. M. HOOD.